(12) United States Patent
Araki (10) Patent No.: US 6,564,617 B1
(45) Date of Patent: May 20, 2003

(54) WATER CUTOFF TESTER FOR GROMMETS

(75) Inventor: Yoshihiro Araki, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/089,059

(22) PCT Filed: Nov. 1, 2000

(86) PCT No.: PCT/JP00/07677

§ 371 (c)(1),
(2), (4) Date: Apr. 4, 2002

(87) PCT Pub. No.: WO01/33181

PCT Pub. Date: May 10, 2001

(30) Foreign Application Priority Data

Nov. 1, 1999 (JP) .......................................... 11-310835
Apr. 28, 2000 (JP) ........................................ 2000-129672

(51) Int. Cl.[7] .............................................. G01M 3/04
(52) U.S. Cl. ............................. 73/49.8; 73/40; 73/49.2; 73/49.3; 73/49.5
(58) Field of Search .................... 73/49.2, 49.3, 73/49.5, 49.8, 40; 29/593

(56) References Cited

U.S. PATENT DOCUMENTS 5,703,279 A * 12/1997 Igura et al. ..................... 29/593
6,168,208 B1 * 1/2001 Thaler ......................... 277/607

FOREIGN PATENT DOCUMENTS

| JP | 8-017542 | 1/1996 | ........... H01R/43/00 |
| JP | 8-255664 | 10/1996 | ........... H01R/43/00 |
| JP | 9-072816 | 3/1997 | ........... G01M/3/04 |
| JP | 2000241288 | 9/2000 | ........... G01M/3/08 |

* cited by examiner

*Primary Examiner*—Helen Kwok
*Assistant Examiner*—David Rogers
(74) *Attorney, Agent, or Firm*—Greenblum & Bernstein, P.L.C.

(57) ABSTRACT

An apparatus for testing a waterproof state of a sub insertion portion of a grommet provided in eccentric with a main insertion portion. The apparatus is provided with an enclosure for sealably enclosing an end portion of the sub insertion portion, an air feeder for feeding air for testing to a space in which the sub insertion portion is sealably accommodated, and a judging apparatus for judging whether the sub insertion portion is in a good waterproof state based on a status of the air fed from the air feeder.

20 Claims, 12 Drawing Sheets

PRIOR ART

FIG. 8

PRIOR ART

WATER CUTOFF TESTER FOR GROMMETS

TECHNICAL FIELD

This invention relates to a waterproof testing apparatus for a grommet.

BACKGROUND ART

Figure 7:
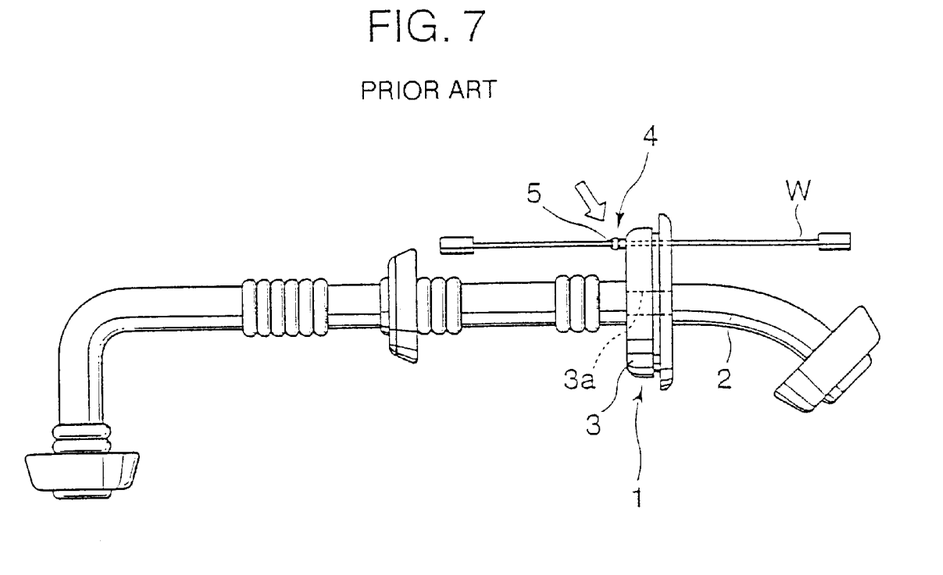
FIG. 7 is a schematic plan view of a grommet of which a test on a waterproof state is implemented.

FIG. 7 is a plan view of a known grommet of which a waterproof state is tested with use of an apparatus according to this invention.

The grommet 1 shown in FIG. 7 is arranged at a certain position on a tube 2 for inserting a wire harness. The grommet 1 has a flange portion 3 fittingly mounted in an insertion hole of a partition wall of a vehicle body. The flange portion 3 has a main insertion portion 3a at a generally middle part thereof for passing a primary trunk part of the wire harness, and a small-diametrical sub insertion portion 4 at a position radially away from the main insertion portion 3a in eccentric therewith. The sub insertion portion 4 includes a boss portion 5 for passing a relatively small number of wirings W in a bundle.

Figure 8:
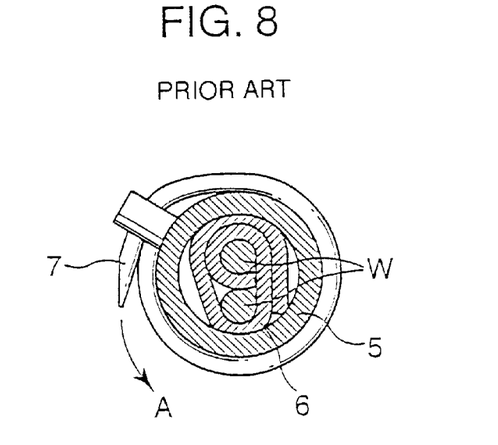
FIG. 8 is a sectional view showing a state that a sub insertion portion of the grommet shown in FIG. 7 is being fastened.

FIG. 8 is a cross sectional view showing a state that the sub insertion portion 4 of the grommet shown in FIG. 7 is being fastened.

As shown in FIG. 8, a polyurethane sheet 6 is wound around the outer circumferential surface of the wiring bundle W with an end portion thereof accommodated in a space between the wirings in order to secure sealability between the inner peripheral surface of the sub insertion portion 4 and the wiring bundle W. A clamp belt 7 wound around the outer peripheral surface of the boss portion 5 is pulled in the direction of arrow A in FIG. 8 to fasten the boss portion 5. Thus, a waterproof state of the grommet is secured.

Heretofore, there has been proposed an apparatus for testing a waterproof state of the main insertion portion of the grommet 1. However, an apparatus for checking whether the sub insertion portion 4 has a waterproof structure has not been put into practice so far.

In view of the above, it is an object of this invention to provide a waterproof testing apparatus for a grommet capable of easily and accurately testing whether a sub insertion portion provided in eccentric with a main insertion portion of the grommet has a waterproof structure.

DISCLOSURE OF THE INVENTION

To accomplish the above object, this invention is directed to an apparatus capable of easily and accurately testing whether a sub insertion portion of a grommet is in a good waterproof state, in which the grommet is provided with a flange portion mountable on a vehicle body, a main insertion portion formed on the flange portion for inserting a bundle of wirings, and the sub insertion portion provided in eccentric with the main insertion portion.

The testing apparatus according to an aspect of this invention comprises enclosing means which sealably encloses an end portion of the sub insertion portion, air feeding means which feeds air for testing to a space of the enclosing means in which the sub insertion portion is sealably accommodated, and judging means which judges a waterproof state of the sub insertion portion based on a status of the air fed by the air feeding means.

BEST MODE FOR CARRYING OUT THE INVENTION

Hereinafter, a preferred embodiment of the invention is described in detail with reference to the accompanying drawings.

Figure 1:
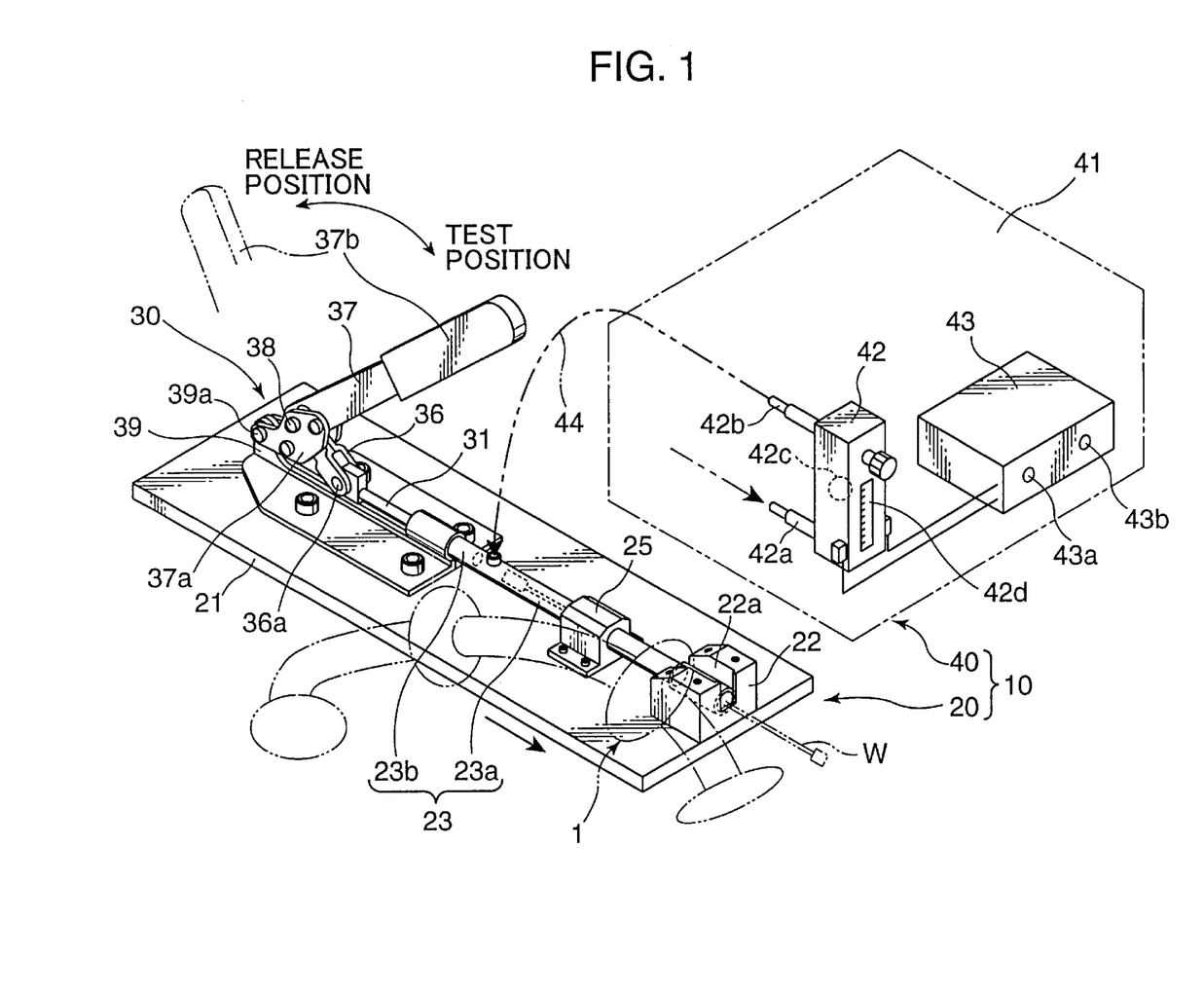
FIG. 1 is a perspective view schematically showing an entire construction of a waterproof testing apparatus in accordance with an embodiment of this invention.
Figure 2:
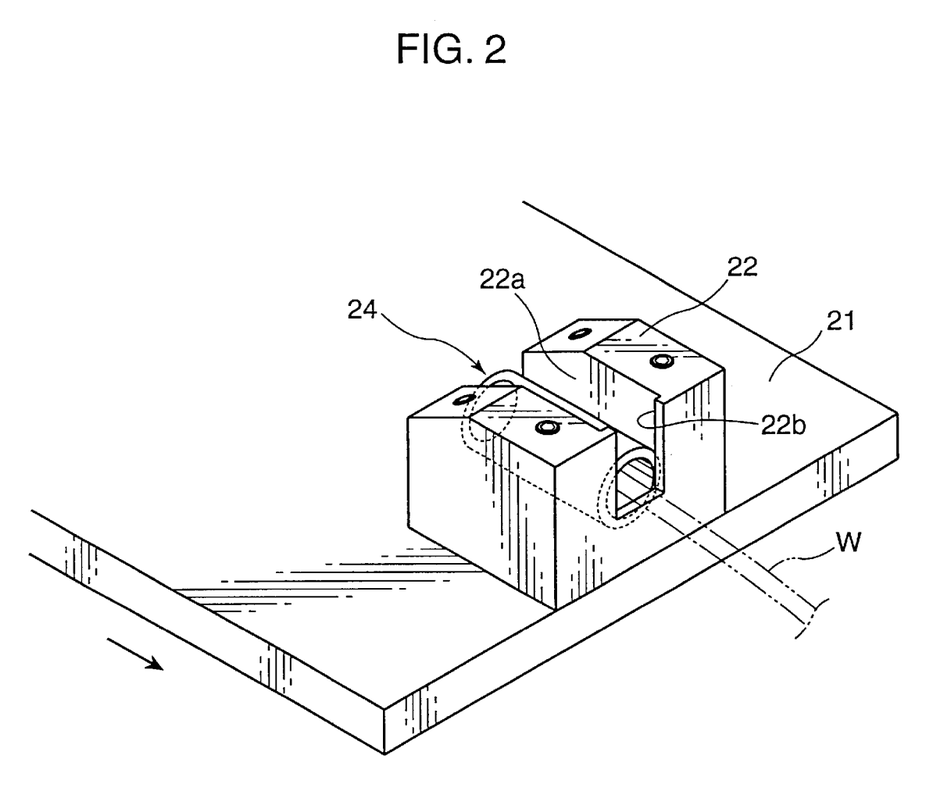
FIG. 2 is an enlarged perspective view showing essential parts of the apparatus shown in FIG. 1.

FIG. 1 is a perspective view schematically showing an entire construction of a waterproof testing apparatus 10 for a grommet in accordance with an embodiment of this invention. FIG. 2 is an enlarged perspective view showing essential parts of the apparatus shown in FIG. 1.

Referring to FIGS. 1 and 2, the testing apparatus 10 in accordance with the embodiment of this invention is described. The apparatus 10 comprises a sealing unit 20 as enclosing means for sealably enclosing an end portion (corresponding to the end portion of the boss portion 5 in FIG. 7) of a sub insertion portion 4 of a grommet 1 substantially equivalent to the grommet shown in FIGS. 7 and 8, and an air checker 40 for checking a waterproof state of the sub insertion portion 4 by feeding air for testing the sealing unit 20.

The sealing unit 20 includes a rectangular plate-like base 21 in plan view, a pipe holder 22 fixedly supported at an end portion on the upper surface of the base 21, an encasing tube 23 which selectively moves toward and away from the pipe holder 22 on the base 21, and an operation mechanism 30 as operation means for drivingly moving the encasing tube 23.

The base 21 is a sheet metal member of a relatively large thickness and has a generally rectangular shape in plan view.

It should be noted that, throughout this specification, a longitudinally end portion of the base 21 (the side where the pipe holder 22 is mounted) is defined as a front side of the apparatus.

Referring to FIG. 2, the pipe holder 22 is described. The pipe holder 22 is a block member made of a resin. The pipe holder 22 has an upright position and is provided transversely in the middle part of the base 21 at a frontal end portion thereof. A groove (housing portion) 22a is formed in an upper part of the pipe holder 22. A pipe 24 is detachably mounted in the housing portion 22a. The pipe 24 is, for example, a hollow cylinder made of e.g., brass. As will be described later, the pipe 24 has such a construction as to allow a bundle of wirings W inserted in the sub insertion portion 4 of the grommet 1 to pass and to press the circumference of the sub insertion portion 4 from a side opposite to the side where the boss portion 5 of the sub insertion portion 4 is formed. A shoulder part 22b against which a frontal surface of the pipe 24 is abutted is formed at a front end of the housing portion 22a to keep the pipe 24 from disengaging from the pipe holder 22.

Next, the arrangement of the encasing tube 23 is described with reference to FIG. 1. The encasing tube 23 is a cylindrical member and is concentrically connectable to the pipe 24 mounted on the pipe holder 22 by a guide member 25 fixedly supported on the base 21 while slidingly movable back and forth of the apparatus 10. In the embodiment shown in FIG. 1, the encasing tube 23 and the pipe 24 constitute a primary part of the enclosing means of this invention.

In the embodiment shown in FIG. 1, the encasing tube 23 has a hollow portion 23a formed at a forward portion of the tube 23 and opened forward, and a solid base end portion 23b integrally formed with the hollow portion 23a. The base end portion 23b is continued from the hollow portion 23a and blocks a rear end of the hollow portion 23a with a base end thereof linked to the operation mechanism 30. The hollow portion 23a of the encasing tube 23 is adapted to accommodate a boss portion 5 constituting part of the sub insertion portion 4 of the grommet 1, and a bundle of wirings W protruding rearward from the boss portion 5 so as to encase the boss portion 5 and its vicinity while securing an airtight state of the boss portion 5, which will be described later in a section regarding a test. The sealing unit 20 is changeable between a test position in which the encasing tube 23 sealably encases the boss portion 5 of the sub insertion portion 4 in cooperation with the pipe 24 and a release position in which the grommet 1 is released for detachable mounting by being drivingly moved back and forth by the operation mechanism 30 which is described in the next section.

In the embodiment shown in FIG. 1, the operation mechanism 30 includes a toggle lever mechanism. The operation mechanism 30 is equipped with a rod 31 projecting from a rear end surface of the encasing tube 23. A rear end portion of the rod 31 is connected to a frontal end portion of each one a pair of arm members 36 to be pivotable about an axis of a pivotal pin 36a. A rear end portion of each one of the arm members 36 is connected to an intermediate portion of a link member 37a fixed to an operation handle 37 to be pivotable about a common axis of a pivotal pin 38. The operation handle 37 is a lever made of a metallic material. A grip portion 37b is formed at one end portion of the operation handle 37 for an operator to manipulate the apparatus by gripping. The opposite end portion of the operation handle 37 is pivotally supported on a pair of brackets 39 fixed to a rear end portion of the base 21 to be pivotable about an axis of a pivotal pin 39a by way of the link member 37a. The pivotal pin 39a has a certain length in a transverse direction of the apparatus 10. With this arrangement, when an operator grips the grip portion 37b of the operation handle 37 and pivotally rotates the operation handle 37 about the axis of the pivotal pin 39a, the encasing tube 23 is movable toward and away from the pipe holder 22 by way of the link member 37a, the arm members 36, and the rod 31. In the embodiment shown in FIG. 1, the apparatus is so designed that pivotally rotating the operation handle 37 counterclockwise in FIG. 1 retracts the encasing tube 23 away from the pipe holder 22, whereas pivotally rotating the operation handle 37 clockwise in FIG. 1 moves the encasing tube 23 toward the pipe holder 22.

Next, the air checker 40 is described. The air checker 40 includes a flow meter 42 provided inside a box member 41, and a judging section 43 electrically connected to the flow meter 42.

The flow meter 42 includes an air feed pipe 42a for feeding air at a certain pressure from an unillustrated pressurized air supply source through a regulator, an air eject pipe 42b for ejecting the pressurized air fed from the air feed pipe 42 as air for testing, and a float 42c which is arranged in an air passage connecting the pipes 42a and 42b and moves up and down depending on an air flow rate through the air passage. With this arrangement, an operator is enabled to read the vertical position of the float 42c through a transparent scale 42d disposed in front of the flow meter 42. The air eject pipe 42b is communicated with the hollow portion 23a of the encasing tube 23 by a connecting pipe 44.

The judging section 43 includes a PASS lamp 43a indicating that a grommet has passed the test and a FAILURE lamp 43b indicating that a grommet has failed the test, and is configured in such a manner that either one of the lamps 43a and 43b is selectively turned on based on a signal output from the flow meter 42.

In the apparatus shown in FIG. 1, in the case where the flow rate is zero, the float 42c is lowered to a lowermost position, and the PASS lamp 43a is turned on, unless otherwise, the float 42c is floatingly moved upward, and the FAILURE lamp 43b is turned on.

Figure 3:
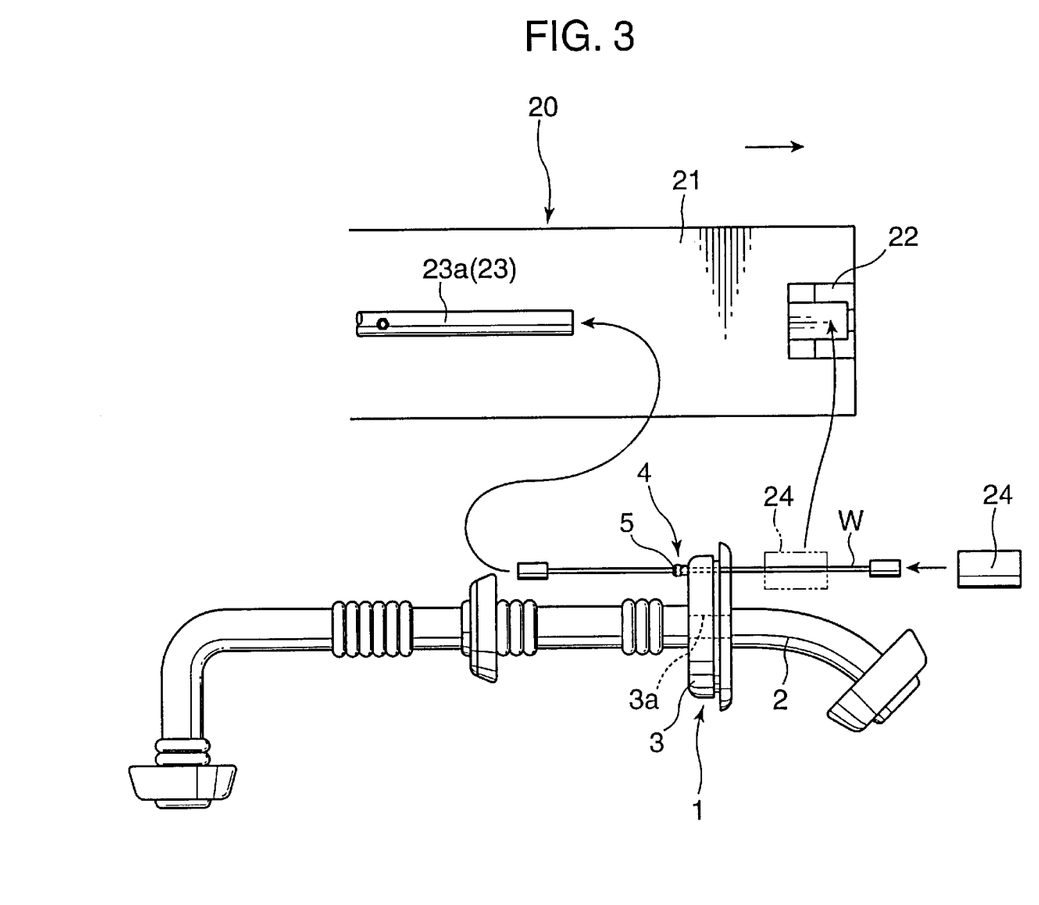
FIG. 3 is a partially plan view illustrating a testing procedure implemented by the apparatus in accordance with the embodiment shown in FIG. 1.
Figure 4:
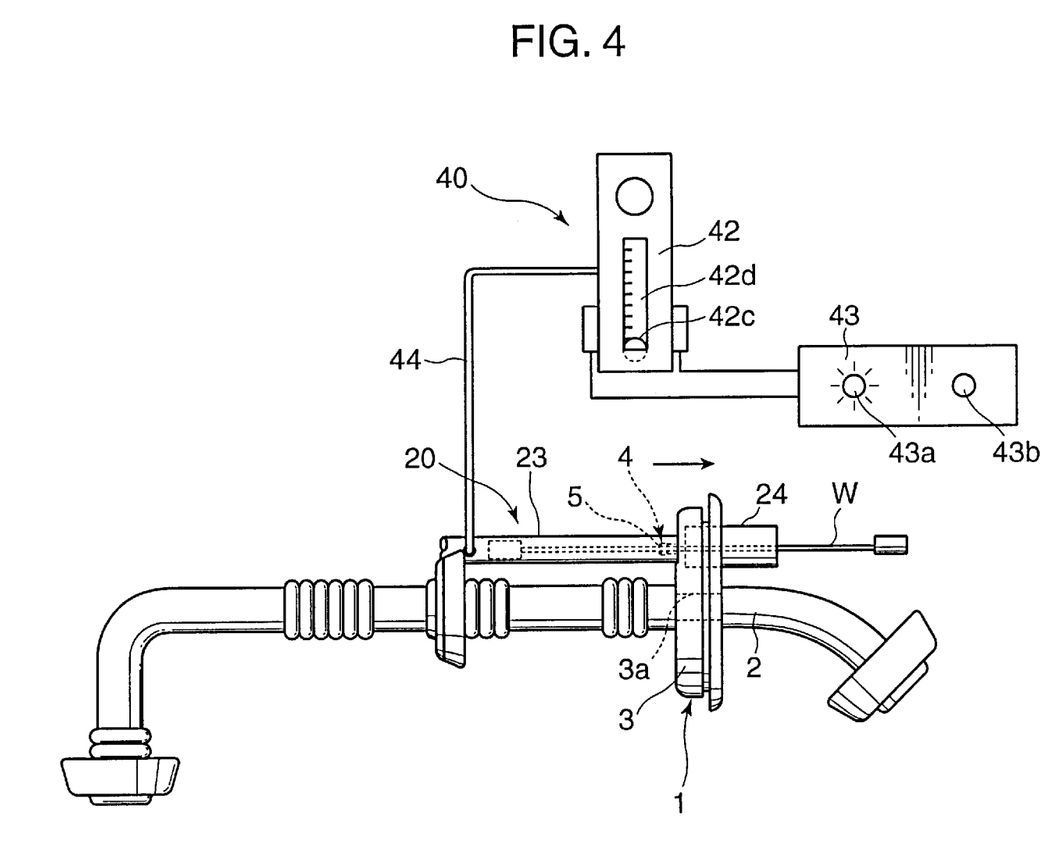
FIG. 4 is a partially plan view illustrating the testing procedure implemented by the apparatus in accordance with the embodiment shown in FIG. 1.
Figure 5:
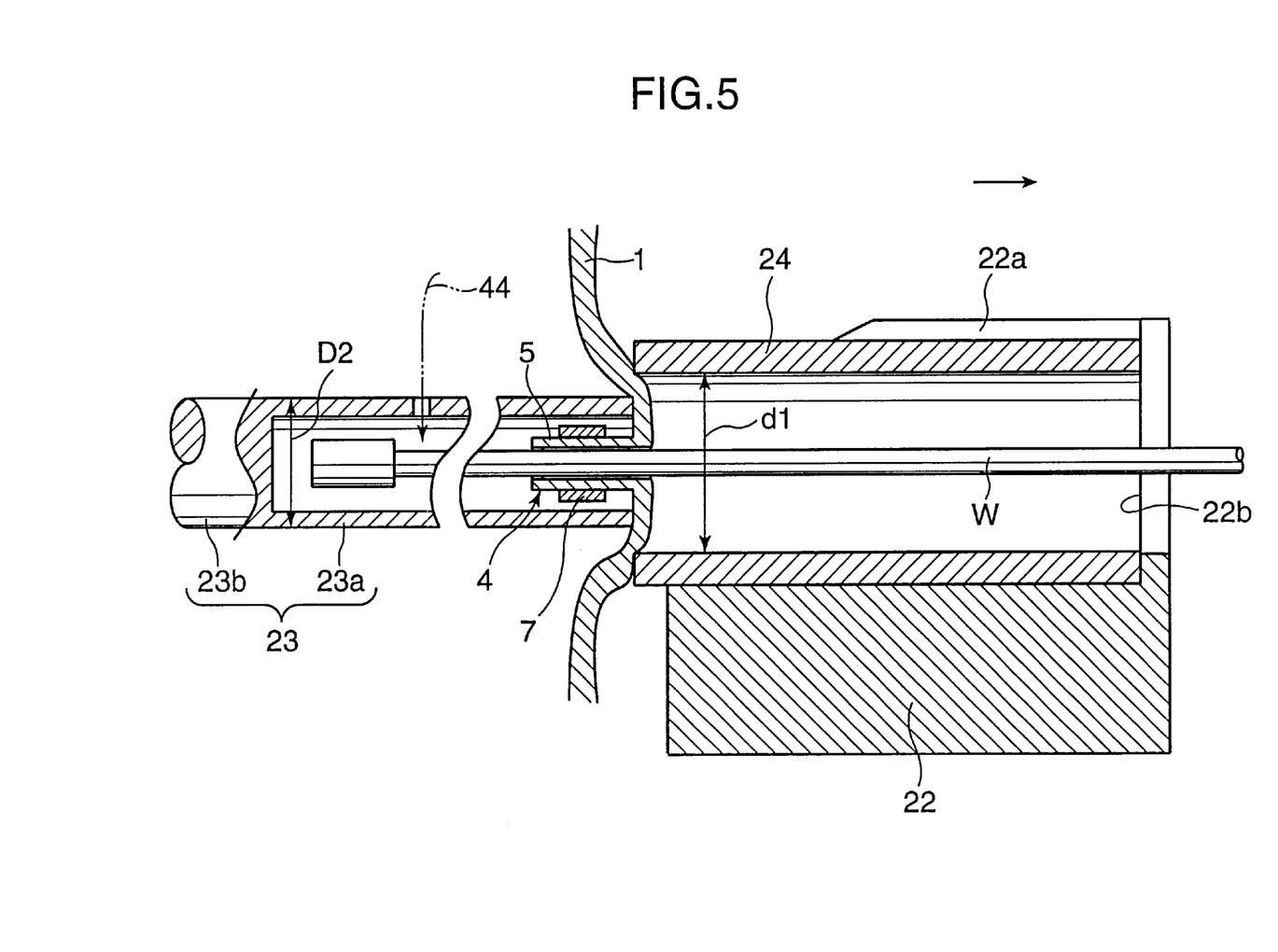
FIG. 5 is an enlarged sectional view showing essential parts of the apparatus in accordance with the embodiment shown in FIG. 1 in testing.

Next, a test procedure by the apparatus in accordance with the embodiment is described with reference to FIGS. 1, and 3 through 5. FIGS. 3 and 4 are partially plan views each illustrating a test procedure to be implemented by the apparatus in accordance with the embodiment shown in FIG. 1. FIG. 5 is an enlarged sectional view showing essential parts of the apparatus in accordance with the embodiment shown in FIG. 1 at the time of testing.

The test procedure is described with reference to FIG. 1. First, an operator tilts the operation handle 37 of the operation mechanism 30 provided in the sealing unit 20 rearwardly downward to retract the encasing tube 23 away from the pipe holder 22 so as to shift the sealing unit 20 from the position shown in FIG. 1 to a release position where the encasing tube 23 is away from the pipe holder 22 (see FIG. 3).

Next, referring to FIG. 3, the operator holds the boss portion 5 that constitutes a part of the sub insertion portion 4 of the grommet 1 in a state that the boss portion 5 faces the rear side of the sealing unit 20 so as to mount the grommet 1 onto the sealing unit 20 in the release state, and inserts the front end portion of the wiring bundle W that has passed through the sub insertion portion 4 into the pipe 24 detached from the pipe holder 22. Thereafter, the operator mounts the pipe 24 onto the pipe holder 22 and accommodates the rear end portion of the pipe 24 in the encasing tube 23. Subsequently, the operator tilts the operation handle 37 forwardly downward to move the tube 23 forward so as to sealably encase the sub insertion portion 4.

The sealing process is described referring to FIG. 5. Moving the tube 23 close to the pipe 24 located in a forward position of the apparatus 10 enables to set the hollow portion 23a of the tube 23 opposingly and generally flush with the pipe 24 in a state that the grommet 1 is pressingly held therebetween. The inner diameter d1 of the pipe 24 is set larger than the outer diameter D2 of the tube 23. In this arrangement, the sub insertion portion 4 of the grommet 1 is sealably accommodated in the hollow portion 23a of the tube 23 in a state that a surrounding of the boss portion 5 is rendered into an airtight state.

In the above state, ejecting pressurized air set at a certain pressure into the encasing tube 23 by the flow meter 42 enables to perform a test on a waterproof state of the sub insertion portion 4.

In the case where the sub insertion portion 4 is in a good waterproof state, the air fed inside the tube 23 does not leak outside of the tube 23. Accordingly, after the air pressure inside the tube 23 reaches a certain level, no more air is fed into the tube 23. As a result, the flow meter 42 indicates a flow rate at zero, and the PASS lamp 43a of the judging section 43 turns on. On the other hand, in the case where the sub insertion portion 4 is not in a good waterproof state, the air leaks through a poorly sealed portion of the sub insertion portion 4, and accordingly, the flow rate of the flow meter 42 does not fall below a certain level. As a result, the FAILURE lamp 43b of the judging section 43 keeps turning on.

After the test, the operator returns the operation handle 37 to a predetermined position so as to set the sealing unit 20 to a release position, and dismounts the grommet 1 according to a procedure in a reverse manner to the procedure of mounting the grommet 1.

As mentioned above, in the foregoing embodiment, introducing air for testing into the hollow portion 23a of the tube 23 enables to test a waterproof state of the sub insertion portion 4. Thereby, sealability corresponding to a waterproof state of the sub insertion portion 4 of the grommet 1 can be checked precisely, and waterproof performance of the grommet 1 can be verified easily.

Particularly, in this embodiment, the inner diameter d1 of the pipe 24 is set larger than the outer diameter D2 of the encasing tube 23. This arrangement enables to provide the grommet 1 disposed between the tube 23 and the pipe 24 with a resiliently wavy configuration in cooperation with the arrangement that the end surface of the pipe 24 is set close to the end surface of the tube 23 in a state that the pipe 24 is set generally flush with the tube 23. Thus, sealability between the grommet 1, and the tube 23 and the pipe 24 which constitute the enclosing means of this invention is improved, thus enabling to perform a test on a waterproof state of the grommet 1 with high precision.

The aforementioned embodiment is merely an example of this invention. This invention is not limited to the foregoing embodiment.

Figure 6:
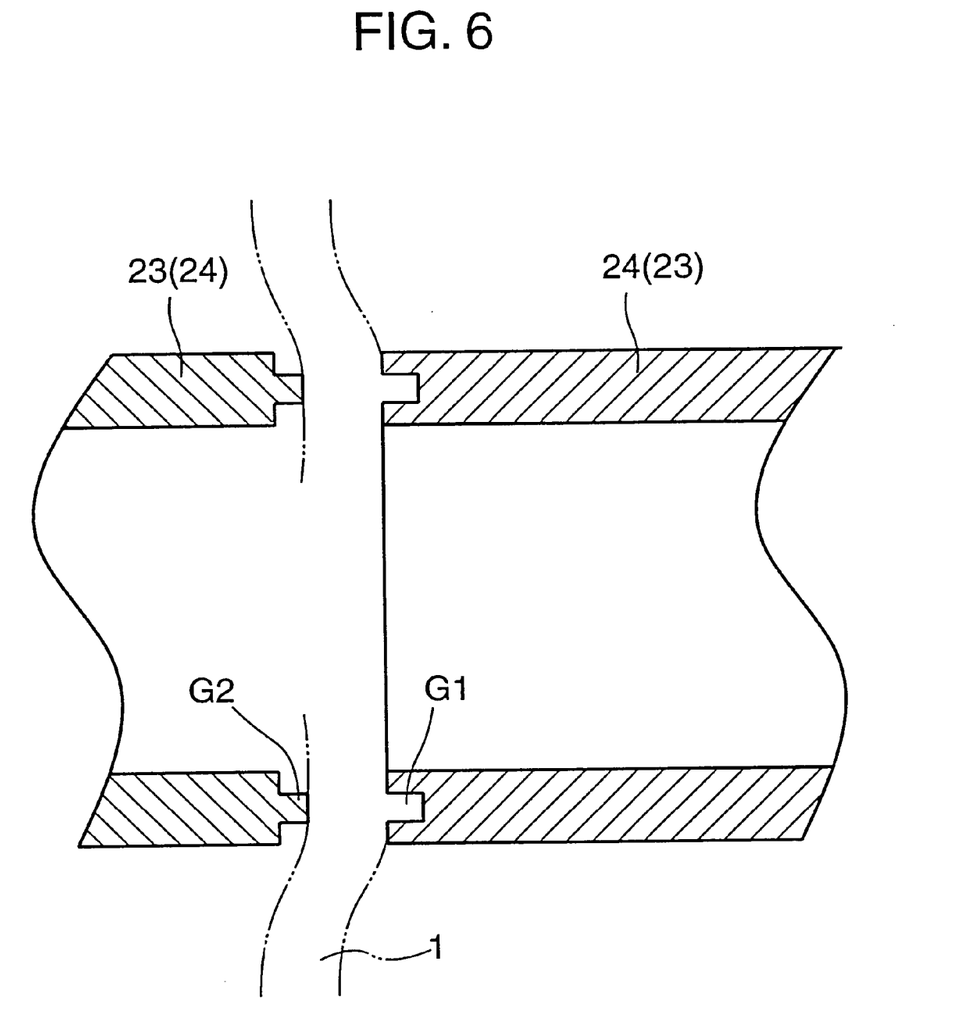
FIG. 6 is a partially sectional view of a modified part of the apparatus in accordance with the embodiment of this invention.

For instance, the pipe 24 and the tube 23 constitute the enclosing means in the embodiment of this invention. Alternatively, the enclosing means may adopt the structure shown in FIG. 6. FIG. 6 is a sectional view showing an altered arrangement of the enclosing means.

As shown in FIG. 6, an annular groove G1 may be formed in an end surface of a pipe 24 or a tube 23 facing each other, whereas an annular rib G2 may be formed on a corresponding end surface of the pipe 24 or the tube 23 in such a manner that the annular groove G1 and the annular rib G2 are engaged with each other. In this case, the engagement of the annular groove G1 and the annular rib G2 provides further sealability between the pipe 24 and the tube 23.

As a further altered arrangement of the enclosing means, an arrangement shown in FIGS. 9 through 12 may be provided.

Figure 9:
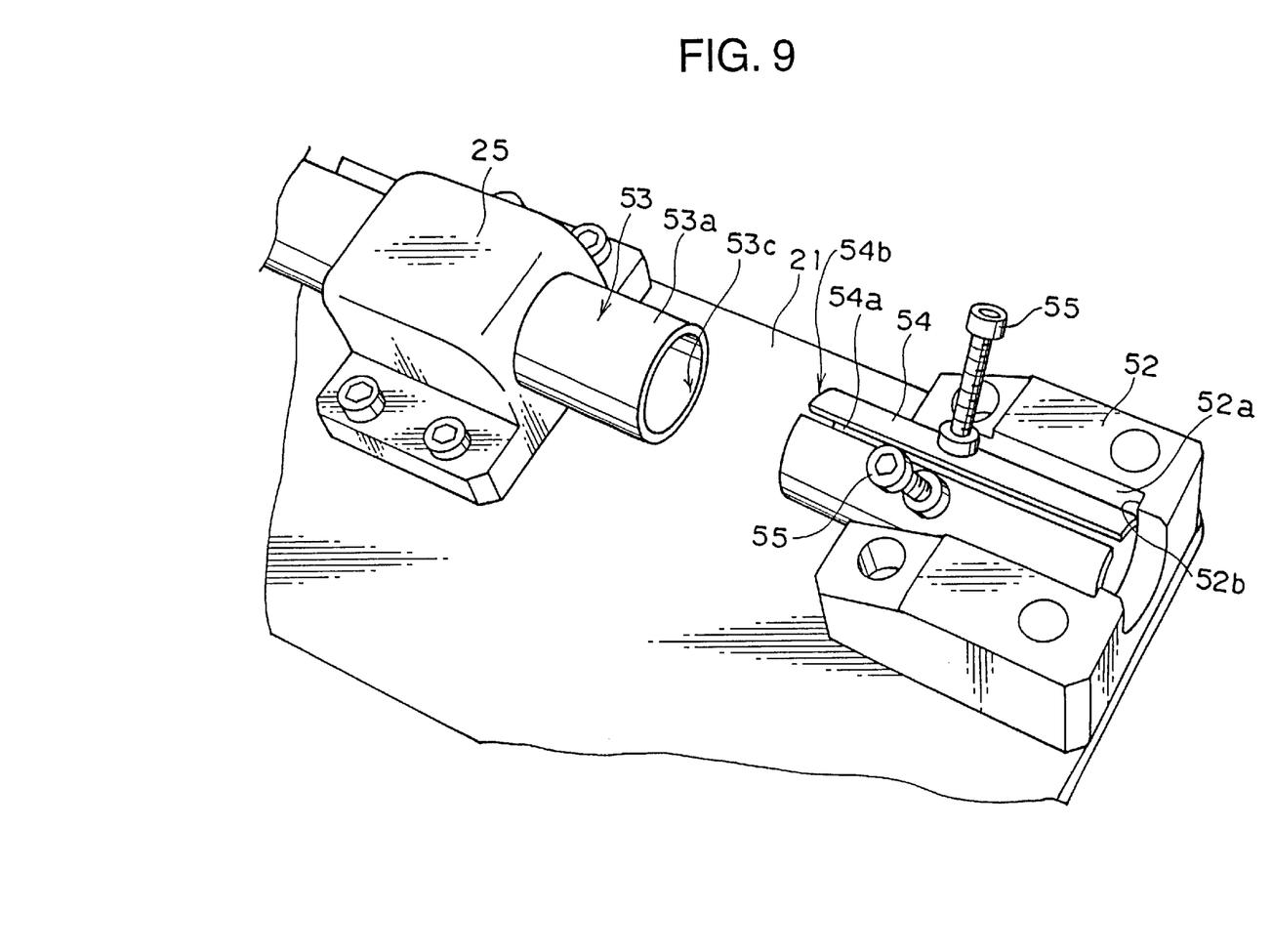
FIG. 9 is a perspective view showing a modification of enclosing means in the apparatus in accordance with the embodiment of this invention.

The enclosing means as the further altered arrangement includes an encasing tube 53 for sealably enclosing an end portion of a sub insertion portion 4 of a grommet 1, and a pipe 54 opposing to the tube 53 with respect to the sub insertion portion 4.

As shown in FIG. 9, the encasing tube 53 is a cylindrical member that is concentrically connectable to the pipe 54 mounted on a pipe holder 52 by a guide member 25 fixedly supported on a base 21 while slidingly movable back and forth of the apparatus.

Figure 11:
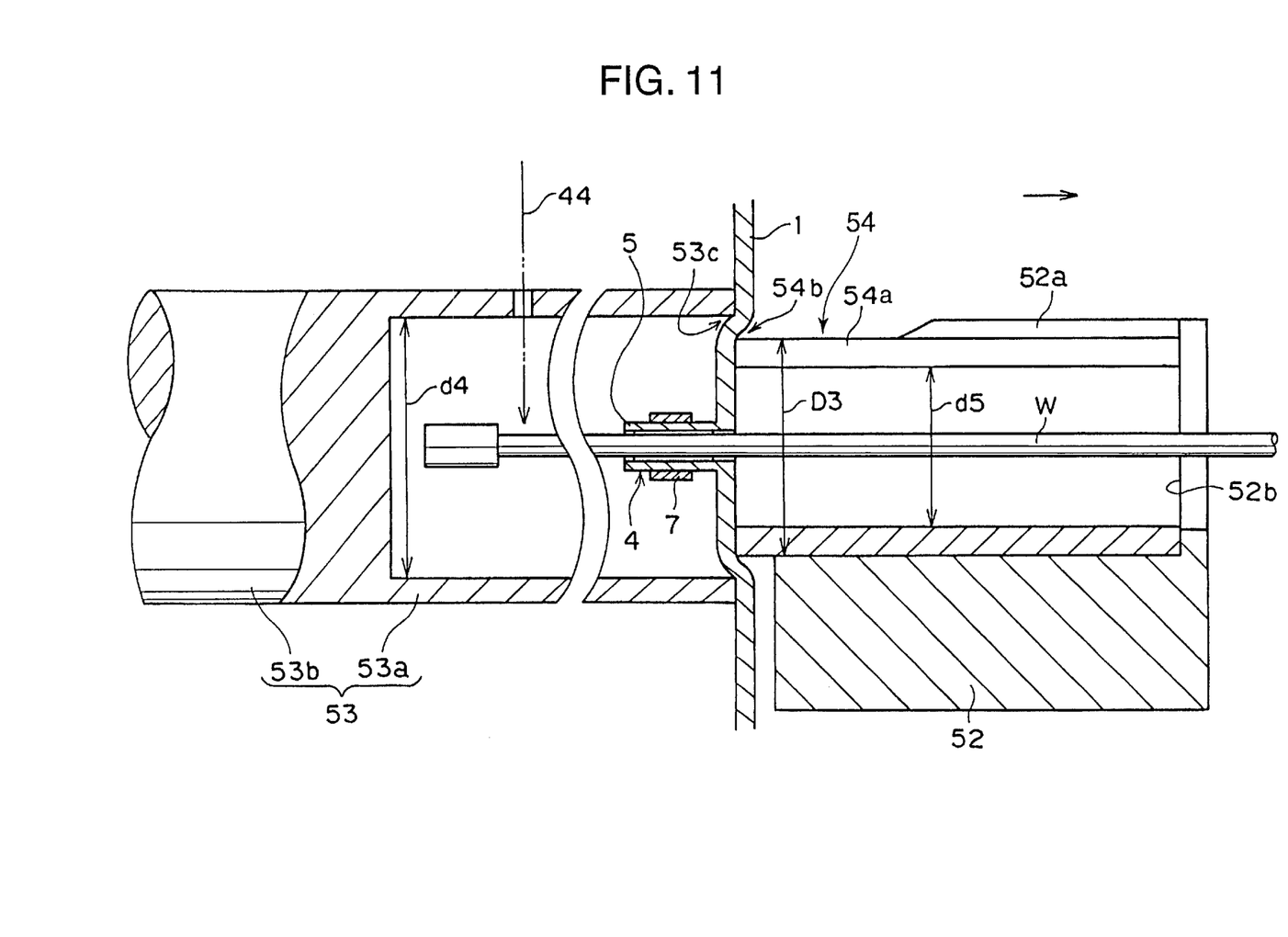
FIG. 11 is an enlarged sectional view showing essential parts of the enclosing means shown in FIG. 9 in testing.

As shown in FIG. 11, the encasing tube 53 has a hollow portion 53a formed at a forward portion of the tube 53 and opened forward, and a base end portion 53b integrally formed with the hollow portion 53a. The base end portion 53b is continued from the hollow portion 53a and blocks a rear end of the hollow portion 53a with a base end thereof linked to an operation mechanism 30. The hollow portion 53a of the tube 53 is adapted to accommodate a boss portion 5 constituting part of the sub insertion portion 4 of the grommet 1, and a bundle of wirings W protruding rearward from the boss portion 5 so as to encase the boss portion 5 and its vicinity while securing an airtight state around the boss portion 5.

The encasing tube 53 is changeable between a test position in which the tube 53 in cooperation with a pipe 54 sealably encases the boss portion 5 of the sub insertion portion 4 and a release position in which the grommet 1 is released for detachable mounting by an operation mechanism similar to the operation mechanism shown in FIG. 1.

The pipe holder 52 is described with reference to FIG. 9. The pipe holder 52 is a block member made of a resin. The pipe holder 52 has an upright position and is provided transversely in the middle part of the base 21 at a frontal end portion thereof. A groove (housing portion) 52a is formed in an upper part of the pipe holder 52. The pipe 54 is detachably mounted in the housing portion 52a. A shoulder part 52b against which a frontal surface of the pipe 54 is abutted is formed at a front end of the housing portion 52a to keep the pipe 54 from disengaging from the pipe holder 52.

Figure 12A:
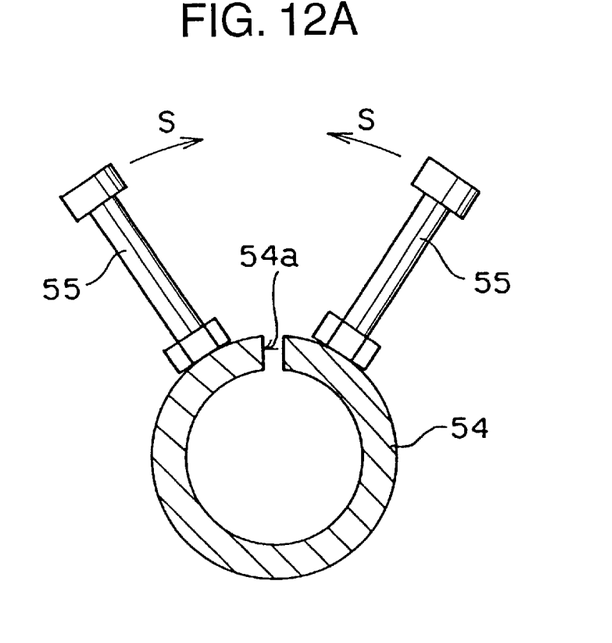
FIGS. 12A and 12B are sectional views radially sectioned each showing that a pipe of the enclosing means shown in FIG. 9 is radially and resiliently deformed to openably close a slit, wherein (a) shows a state that the slit is opened, and (b) shows a state that the slit is closed.

The pipe 54 is a hollow cylinder made of a resiliently deformable resin or its equivalent. The pipe 54 has a generally C-shape in cross section with a slit 54a extending longitudinally in the pipe 54. Preferably, the pipe 54 may be made of a relatively soft material such as polyvinyl chloride (PVC). As shown in FIG. 12A, a pair of operative rods 55 are provided in a state that the operative rods 55 extend radially outwardly from the outer peripheral wall of the pipe 54 symmetrically with respect to the slit 54a. The operative shafts 55 define a V-shape viewed from a front direction of the apparatus. Manipulating the operative rods 55 enables an operator to openably close the slit 54a with a less external force.

As shown in FIG. 11, in the modification, the outer diameter D3 of the pipe 54 is set smaller than the inner diameter d4 of the encasing tube 53 when the pipe 54 resiliently reduces its diameter to close the slit 54a at the time of testing. Such a dimensional arrangement enables to tightly hold the grommet 1 between the pipe 54 and the tube 53 by pressing a lead end portion 54b of the pipe 54 against an inner peripheral end 53c of the encasing tube 53.

Figure 12B:
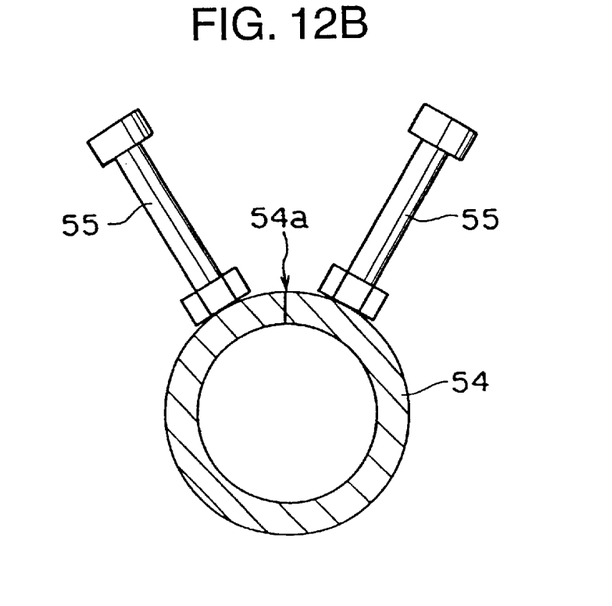

Specifically, shifting the encasing tube 53 to a testable state while closing the slit 54a by resilient deformation of the pipe 54 of the enclosing means as shown in FIG. 12B and interposing the grommet 1 between the tube 53 and the pipe 54 enables to place the grommet 1 in a certain squeezed state between the pipe 54 and the tube 53 by pressing abutment of the lead end portion 54b of the pipe 54 against the inner peripheral end 53c of the encasing tube 53. The dimensional relation between the inner diameter of the pipe 54 and the outer diameter of the encasing tube 53 is optimally settable as long as sealability between the grommet and the enclosing means at the time of testing is secured.

Figure 10:
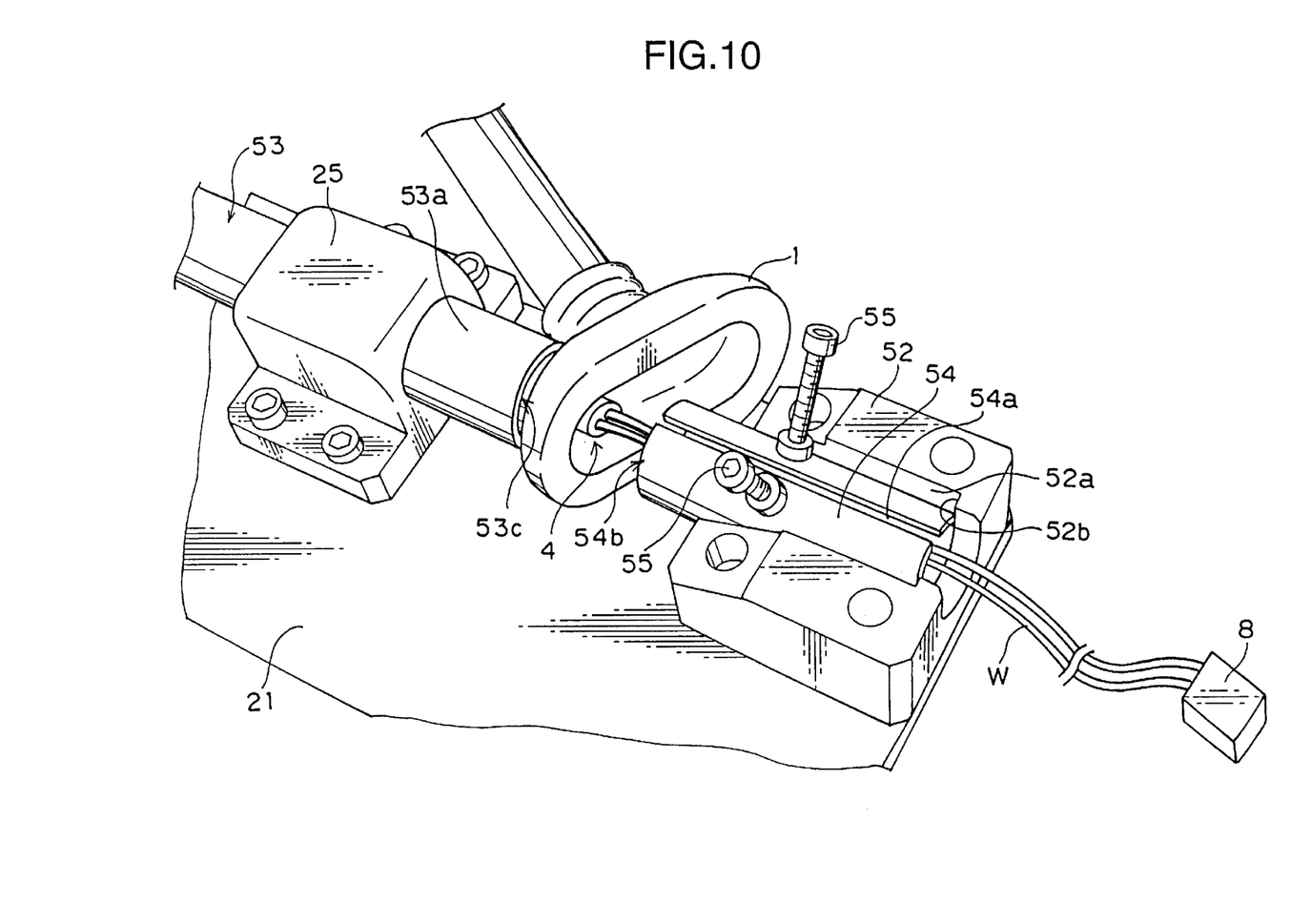
FIG. 10 is a perspective view showing a manner as to how the sub insertion portion of the grommet is mounted to the enclosing means shown in FIG. 9.

In the above arrangement, as shown in FIG. 9, in the case where the sub insertion portion 4 of the grommet 1 is tested, an operator places the pipe 54 into the housing portion 52a of the pipe holder 52 in a state that the slit 54a is opened. Then, the operator places a wiring bundle W that has passed through the sub insertion portion 4 of the grommet 1 inside the pipe 54 through the slit 54a as shown in FIG. 10. Next, the operator manipulates the operative rods 55 in the directions S, S respectively, as shown in FIG. 12A, to resiliently deform the pipe 54, and then, closes the slit 54a as shown in FIG. 12B. Subsequently, drivingly moving the tube 53 forward by an operation mechanism similar to the operation mechanism shown in FIG. 1 enables to hold the grommet 1 between the pipe 54 and the tube 53 in a state that the lead end portion 54b of the pipe 54 is pressed against the inner peripheral end 53c of the tube 53. This arrangement secures high sealability between the grommet and the enclosing means, and enables the apparatus to perform a test on a waterproof state of the grommet with high precision.

Further, forming the slit 54a in the pipe 54 facilitates mounting the sub insertion portion 4 of the grommet 1 on the apparatus, thereby improving operability of the apparatus. This arrangement is advantageous in the case where passing a connector 8 through the pipe 54 for insertion of a wiring bundle W is disabled because the connector 8 connected to a terminal at an end portion of the wiring bundle W has an outer configuration larger than the inner diameter of the pipe 54.

Figure 13:
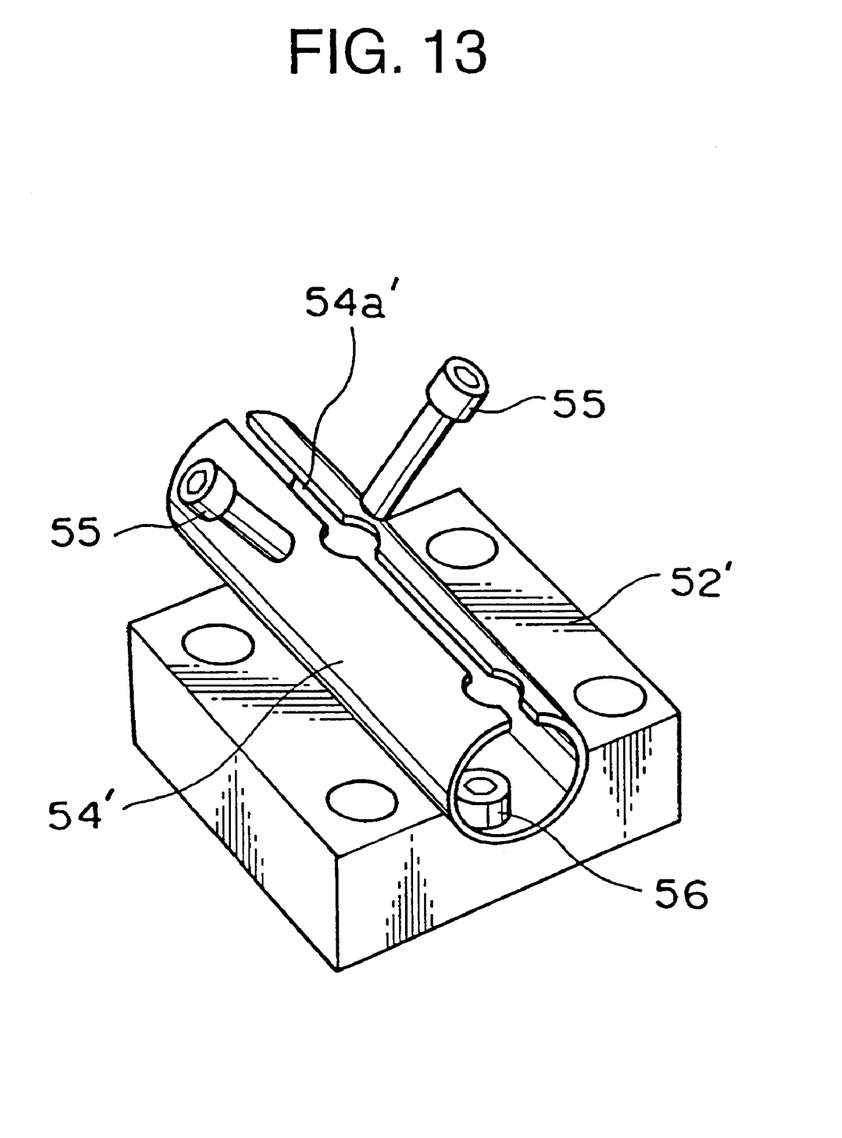
FIG. 13 is a perspective view illustrating a modification of the enclosing means shown in FIG. 9 including a pipe and a pipe holder.

As an altered form, as shown in FIG. 13, there may be provided a simple construction in which a pipe 54' is fixed to a pipe holder 52' by a bolt 56 with a slit 54' opened upward in place of the arrangement shown in FIG. 9 in which the pipe 54 and the pipe holder 52 constitute the enclosing means.

In the foregoing embodiment and modifications, the apparatus enables to test a waterproof state of the sub insertion portion by sealably enclosing an end portion of the sub insertion portion of the grommet by the enclosing means and by feeding air for testing to the enclosing means.

As mentioned above, a judgment as to whether the grommet has passed the test is determined based on the flow rate of air fed to the enclosing means so as to judge whether the grommet is in a good waterproof state depending on the status of air fed to the enclosing means. Alternatively, a judgment may be made in water so as to determine whether the supplied air leaks outside of the enclosing means.

As mentioned above, the arrangement in which the enclosing means is constructed by the encasing tube for encasing the end portion of the sub insertion portion and a pipe opposing the encasing tube with respect to the sub insertion portion, and the pipe has the inner diameter larger than the outer diameter of the encasing tube enables to provide the grommet with a wavy configuration when the grommet is interposed between the encasing tube and the pipe. This arrangement improves sealability between the grommet and the enclosing means composed of the encasing tube and the pipe, and enables the apparatus to perform a test on a waterproof state of the grommet with high precision.

Furthermore, according to another aspect of this invention, the enclosing means includes the encasing tube for encasing the one end portion of the sub insertion portion and the pipe opposing the encasing tube with respect to the sub insertion portion. The pipe is formed with a longitudinally extending slit and has a generally C-shape in cross section. With this arrangement, resiliently deforming the pipe to open and close the slit enables to place a wiring bundle that has passed through the sub insertion portion of the grommet into the pipe through the slit of the pipe. This arrangement facilitates mounting the sub insertion portion of the grommet onto the apparatus and improves operability of the apparatus. This arrangement is advantageous in the case where passing a connector through a pipe for insertion of a wiring bundle is disabled because a terminal at an end portion of the wiring bundle has an outer configuration larger than the inner diameter of the pipe.

According to still another aspect of this invention, pressingly mounting the grommet between the encasing tube and the pipe by resiliently reducing the diameter of the pipe in a state that the slit is closed secures sealability between the grommet and the enclosing means composed of the encasing tube and the pipe. This arrangement enables the apparatus to perform a test on a waterproof state of the grommet with high precision.

Preferably, the enclosing means of this invention includes a tube with a closed end at one end thereof to receive the one end portion of the sub insertion portion, and a hollow cylinder for pressingly sandwiching the sub insertion portion with the tube.

Preferably, the tube and the hollow cylinder are so designed as to pressingly sandwich the grommet therebetween in such a manner that the grommet is formed with a wavy configuration.

Preferably, the tube may tightly hold the grommet in a state that a flange portion of the grommet presses an inner peripheral end thereof.

The enclosing means may preferably include a holder for detachably holding the hollow cylinder.

Preferably, an inner diameter of the tube is set larger than an outer diameter of the hollow cylinder, or vice versa.

The hollow cylinder may include a resilient member of a C-shape in cross section for resiliently opening and closing a slit to encase a wiring bundle of a grommet.

Preferably, the hollow cylinder may be fixed concentrically with the tube and opposing thereto while the slit is closed.

Preferably, the hollow cylinder may include a pipe made of a resin.

It should be appreciated that a variety of modifications and alterations are applicable as long as such modifications and alterations do not deviate from the scope of claims of this invention.

EXPLOITATION IN INDUSTRY

According to this invention, a test as to whether a sub insertion portion is in a good waterproof state can be performed by introducing air for testing to enclosing means. In this arrangement, sealability corresponding to a waterproof state of the sub insertion portion of a grommet can be checked precisely. Thus, an operator can verify waterproof performance of the grommet easily.

What is claimed is:

1. An apparatus for testing a waterproof state of a sub insertion portion of a grommet provided with a flange portion mountable on a vehicle body, a main insertion portion formed on the flange portion to insert a bundle of wirings, and the sub insertion portion provided eccentrically on the grommet relative to the main insertion portion, comprising:

enclosing means for sealably enclosing only an end portion of the sub insertion portion provided eccentrically on the grommet;

air feeding means for feeding air for testing to a space in which the sub insertion portion is sealably accommodated; and judging means for judging whether the sub insertion portion is in a good waterproof state based on a status of the air fed from the air feeding means.

2. The apparatus according to claim 1, wherein the enclosing means includes a tube with a bottom which encases an one end portion of the sub insertion portion and a hollow cylinder which pressingly pinches the sub insertion portion with the tube.

3. The apparatus according to claim 2, wherein the tube and the hollow cylinder pinch the grommet therebetween in such a manner as to form a wavy configuration on the grommet.

4. The apparatus according to claim 2, wherein the tube is adapted to encase the grommet in such a manner that the flange portion of the grommet is pressed against an inner peripheral end at one end of the tube.

5. The apparatus according to claim 2, wherein the enclosing means includes a holder for detachably holding the hollow cylinder.

6. The apparatus according to claim 2, wherein one of the tube and the hollow cylinder has an inner diameter larger than an outer diameter of the other one.

7. The apparatus according to claim 2, wherein the hollow cylinder includes a resilient member of a C-shape in cross section, the resilient member being formed with a slit for receiving the wiring bundle of the grommet therein and having such a configuration as to resiliently open and close the slit.

8. The apparatus according to claim 7, wherein the hollow cylinder is fixed concentrically with the tube and opposing thereto when the slit is dosed.

9. The apparatus according to claim 7, wherein the hollow cylinder is a pipe made of a resin.

10. The apparatus for testing a waterproof state of a sub insertion portion of a grommet according to claim 1, wherein said enclosing means comprises:

a first member and a second member, said first and second members being configured to sealably enclose only an end portion of the sub insertion portion provided eccentrically on the grommet, wherein one of said first member and said second member includes a recess that accommodates a wire bundle inserted in the sub insertion portion.

11. An apparatus for testing a waterproof state of a sub insertion portion of a grommet provided with a flange portion mountable on a vehicle body, a main insertion portion formed on said flange portion to insert a bundle of wires, said sub insertion portion eccentrically provided in relation to said main insertion portion, comprising:

an enclosure configured to sealingly enclose only an end portion of said sub insertion portion eccentrically provided in relation to said main insertion portion;

an air feeder configured to feed air for testing to a space in which said sub insertion portion is sealingly accommodated; and a judging apparatus configured to determine whether said sub insertion portion is in a waterproof state, based on a status of the air fed from said air feeder.

12. The apparatus according to claim 11, wherein said enclosure comprises: a tube with a bottom configured to encase an end portion of said sub insertion portion; and a hollow cylinder configured to pressingly pinch said sub insertion portion with said tube.

13. The apparatus according to claim 12, wherein said tube and said hollow cylinder pinch said grommet therebetween to substantially form a wave configuration on said grommet.

14. The apparatus according to claim 12, wherein said tube is configured to encase said grommet such that said flange portion of said grommet is pressed against an inner peripheral end at one end of said tube.

15. The apparatus according to claim 12, wherein said enclosure comprises a holder for detachably holding said hollow cylinder.

16. The apparatus according to claim 12, wherein one of said tube and said hollow cylinder has an inner diameter larger than an outer diameter of the other of said tube and said hollow cylinder.

17. The apparatus according to claim 12, wherein said hollow cylinder comprises a resilient member having a substantially C-shaped cross section, said resilient member comprising a slit configured to receive the bundle of wires of said grommet therein, said slit further configured to resiliently open and close.

18. The apparatus according to claim 17, wherein:

said hollow cylinder is configured to be concentrically arranged with said tube; and said hollow cylinder and said tube are configured to be arranged opposite each other when said slit is closed.

19. The apparatus according to claim 17, wherein said hollow cylinder is made of a resin.

20. The apparatus for testing a waterproof state of a sub insertion portion of a grommet according to claim 10, wherein said enclosure comprises:

a first member and a second member, said first and second members being configured to sealingly enclose only an end portion of the sub insertion portion eccentrically provided in relation to said main insertion portion, wherein one of said first member and said second member includes a recess that accommodates a wire bundle inserted in the sub insertion portion.

* * * * *

UNITED STATES PATENT AND TRADEMARK OFFICE
CERTIFICATE OF CORRECTION

PATENT NO.    : 6,564,617 B1
DATED         : May 20, 2003
INVENTOR(S)   : Yoshihiro Araki It is certified that error appears in the above-identified patent and that said Letters Patent is hereby corrected as shown below:

<u>Title page,</u>
Item [56], References Cited, OTHER DOCUMENTS, should be included:

-- English Language Abstract for JP. Appln. 9-72816
English Language Abstract for JP. Appln. 8-255664
English Language Abstract for JP. Appln. 2000-241288
English Language Abstract for JP. Appln. 8-17542 --.

<u>Column 10,</u>
Line 51, "claim 10" should be -- claim 11 --.

Signed and Sealed this

Twenty-fourth Day of February, 2004

JON W. DUDAS
*Acting Director of the United States Patent and Trademark Office*